United States Patent [19]

Landsman et al.

[11] 3,956,014

[45] May 11, 1976

[54] PRECISELY-STRUCTURED ELECTROCHEMICAL CELL ELECTRODE AND METHOD OF MAKING SAME

[75] Inventors: Douglas A. Landsman, West Hartford; Edward I. Thiery, Winsted, both of Conn.

[73] Assignee: United Technologies Corporation, East Hartford, Conn.

[22] Filed: Dec. 18, 1974

[21] Appl. No.: 533,917

[52] U.S. Cl. .......................... 136/86 D; 136/120 FC

[51] Int. Cl.[2] ....................... H01M 4/00; H01M 4/04

[58] Field of Search ..................... 136/86 D, 120 FC

[56] References Cited

UNITED STATES PATENTS

| | | | |
|---|---|---|---|
| 3,770,509 | 11/1973 | Winsel | 136/120 FC |
| 3,854,944 | 12/1974 | Binder et al. | 136/120 FC |

*Primary Examiner*—John H. Mack
*Assistant Examiner*—H. A. Feeley
*Attorney, Agent, or Firm*—Steven F. Stone

[57] ABSTRACT

An electrochemical cell electrode, having clearly segregated and structured hydrophobic gas channels and electrolyte-filled catalyst channels is provided in which the size and shape of the various passages are such that they offer little resistance to the passage of reactants and products. The electrode consists of alternate layers of porous hydrophobic material and porous hydrophilic catalyst-containing material. The electrode is formed by first depositing the alternate layers of materials and then cutting the structure in a plane at right angles to the plane of deposition at a thickness equal to that of the end product. Electrodes of varying size can be constructed of panels so produced.

11 Claims, 7 Drawing Figures

12
13a
13b
13a
12

FIG_1

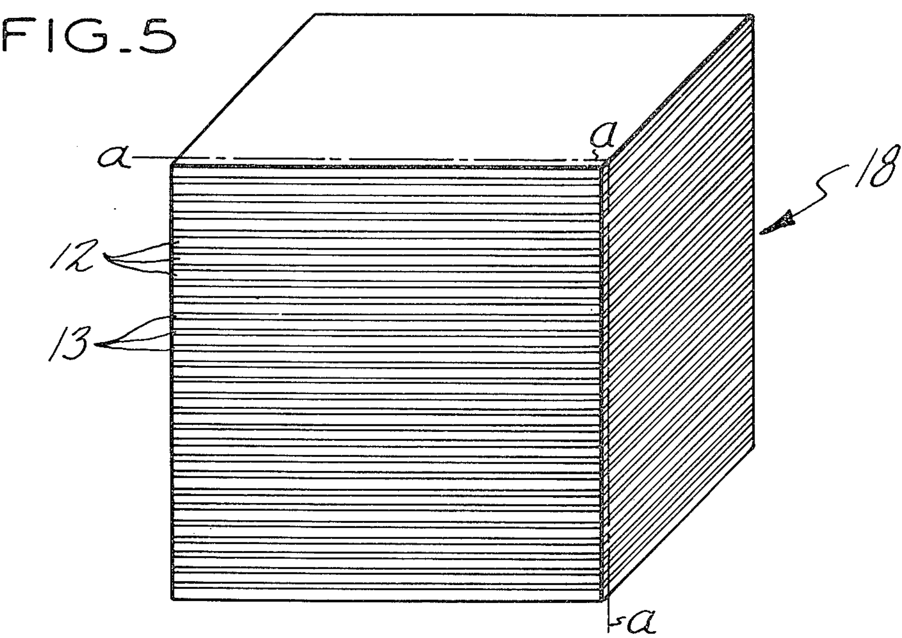
FIG_5
a
a
18
12
13
a
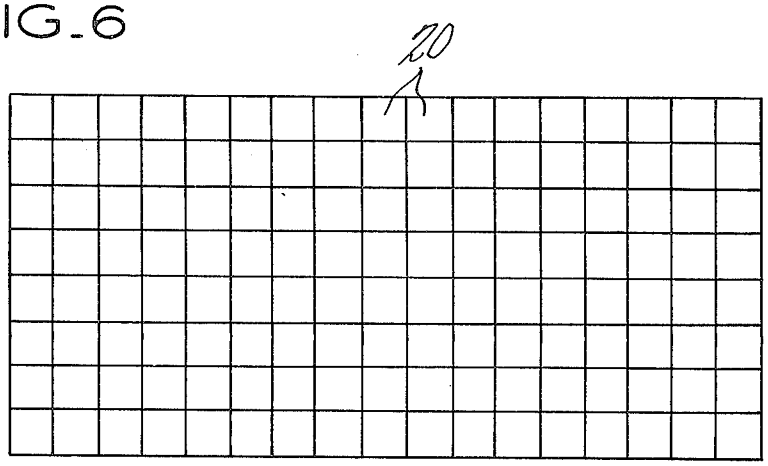
FIG_6
20
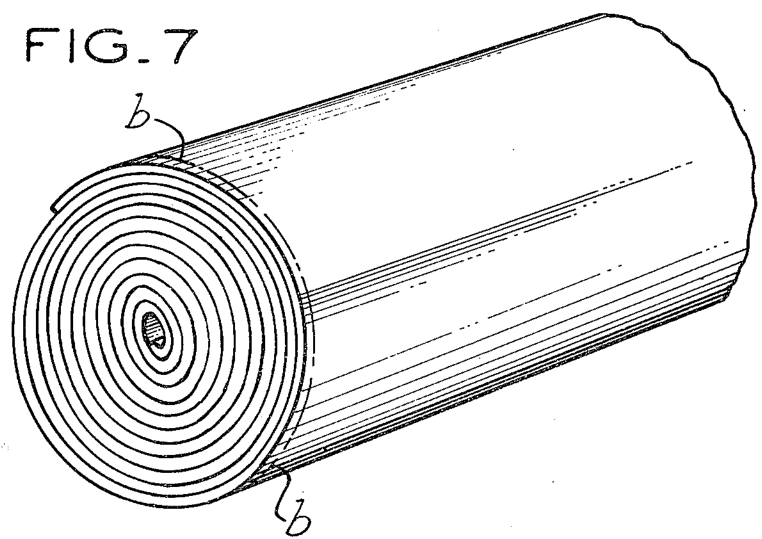
FIG_7
b
b

PRECISELY-STRUCTURED ELECTROCHEMICAL CELL ELECTRODE AND METHOD OF MAKING SAME

BACKGROUND OF THE INVENTION

Gas diffusion electrodes, as used in fuel cells and metal-air batteries, are generally made by mixing together finely divided particles of catalyst and a hydrophobic material, such as Teflon (brand of polytetrafluoroethylene, PTFE, manufactured by E. I. DuPont DeNemours & Co. (Inc.), Wilmington, Del. U.S.A.). The mixture is then deposited on a gas-permeable, conductive substrate to form the electrode structure. In this structure, the PTFE particles provide a hydrophobic porous matrix which will not be wetted by the electrolyte and through which diffusion of gaseous reactants and products can occur. The catalyst, ofttimes deposited on a catalyst support such as graphite or carbon, provides a hydrophilic porous matrix which is wetted by the electrolyte and through which the diffusion of dissolved reactants and products and also the migration of ions can occur. It should be recognized that the terms "hydrophobic" and "hydrophilic" as used herein denote wettability with respect to the electrolyte and are not intended to be limited to mean wettability with respect to water. In the operation of the electrode, the gaseous reactant diffuses through the PTFE matrix, dissolves in the electrolyte which fills the catalyst agglomerates and diffuses to the surface of the catalyst where the electrochemical reaction takes place. The electrons transferred during the chemical reaction are then conducted from the catalyst particle or its support to the conducting substrate.

As a result of the method of construction, the size, shape and orientation of the various particles and the flow channels formed therebetween are random. In some cases catalyst particles are fully insulated from the conducting substrate. Any catalyst so located will be wasted since, in the absence of a current-conducting path between the catalyst and the substrate, no chemical reaction can occur. Also, during the mixing operation, catalyst particles tend to agglomerate. Formation of too large agglomerates will result in waste of the catalyst since the center of the catalyst agglomerate receives an inadequate supply of the reactant gas. Formation of too small agglomerates will result in poor ionic and electronic conductance within the electrode structure. According to this invention, however, an electrode structure is provided in which clearly defined and controllable gas and liquid passages are provided and in which the catalyst can be located at the interfaces therebetween in a manner producing maximum catalyst utilization and minimum resistance to the flow of reactants, products, ions and electrons.

It is accordingly an object of this invention to provide a novel electrochemical cell electrode structure having clearly defined hydrophobic and hydrophilic passages.

It is another object of this invention to provide a method of manufacture of such an electrode structure.

These and other objects of the invention will be readily apparent from the following description with reference to the accompanying drawings wherein:

FIG. 5 is a representation of the product produced at one stage in the preparation of the electrode according to this invention;

FIG. 6 is a representation of the product in another stage of preparation; and FIG. 7 is a representation of another embodiment of this invention.

DESCRIPTION OF THE INVENTION

Figure 1:
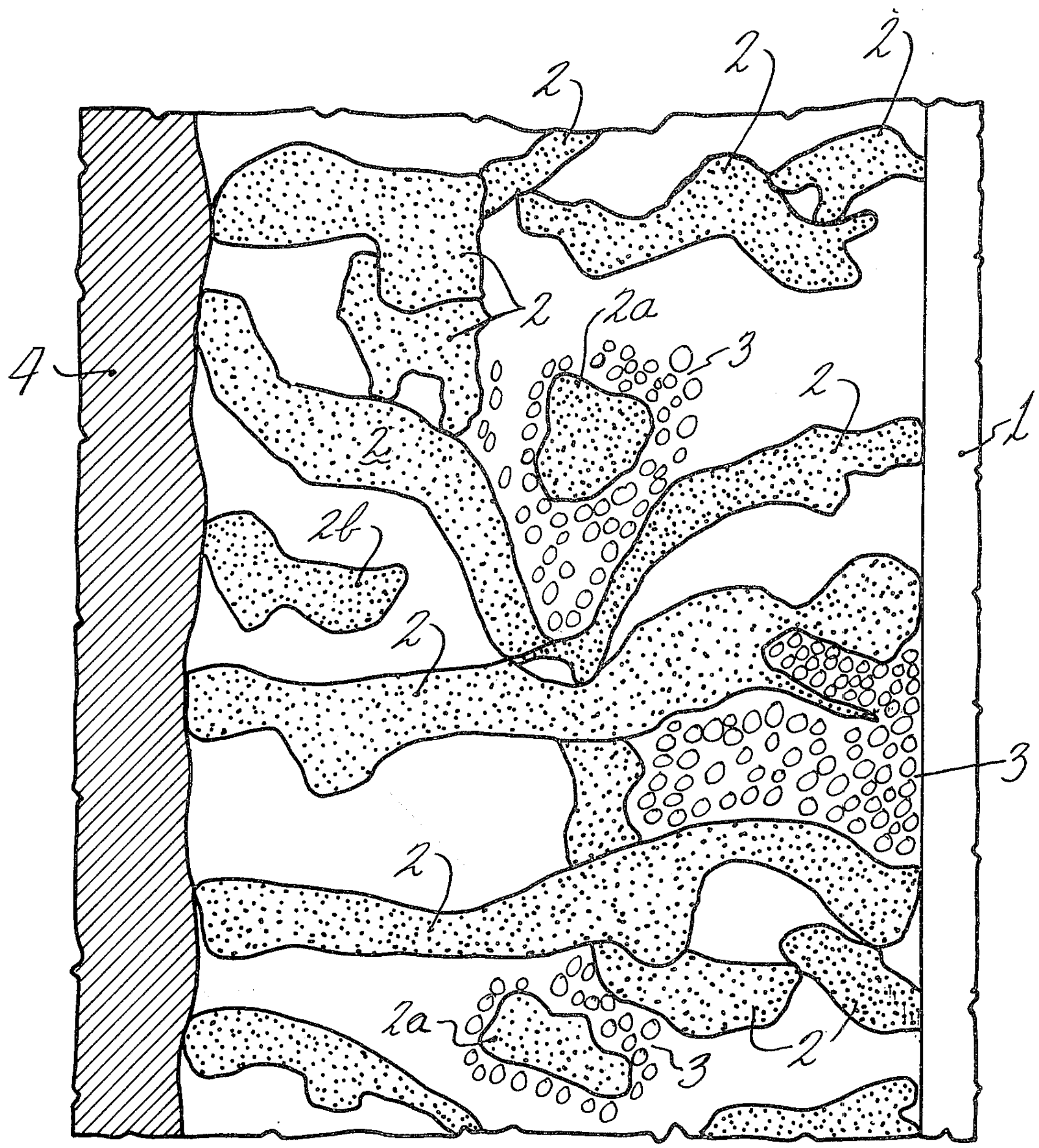
FIG. 1 is a schematic cross-sectional view of a gas diffusion electrode of the prior art.

Referring now to FIG. 1, a catalyzed, PTFE-bonded, gas diffusion, fuel cell electrode of the prior art is illustrated adjacent the fuel cell electrolyte retaining matrix 4. Such an electrode consists of a conducting substrate 1 which is permeable to gas and preferably formed of a wet-proofed metal screen or carbon paper mat. Conducting particles 2 having catalyst disposed upon the surface thereof, are bonded to the substrate 1 and to each other by means of hydrophobic particles 3 which provide a porous hydrophobic network for the diffusion of gas through the electrode structure. The conducting particles can be carbon, graphite, or other porous electrically conductive, chemically inert material, which is either inherently hydrophilic or capable of being rendered hydrophilic so that it may be wetted by the electrolyte to provide-gas-liquid-catalyst interfaces throughout the body of the electrode. In FIG. 1, it is understood that hydrophobic particles 3 fill all of the void spaces between the particles 2; however, the bulk of these particles have been omitted from FIG. 1 for clarity. In operation, the gaseous components of the fuel cell would be diffused into the electrode through the substrate 1 and electrolyte would diffuse into the fuel cell through the opposite surface. In order for the electrochemical cell to operate, the electron transfer necessary for the chemical reaction to occur must be capable of taking place. Thus, particles such as 2*a* which are completely surrounded by insulating particles 3 and thereby separated from the conducting substrate 1, cannot partake in the chemical reaction and any catalyst contained on this particle is wasted. Similarly, particle 2*b* although not fully surrounded by insulation, is still insulated from conducting substrate 1 and this too cannot enter into the chemical reaction. Also, as can be seen, the shape and configuration of the gas channels is random and tortuous. These variations in size from one portion of the electrode to the other are accompanied by variations in the ability of electrolyte, gas and reaction products to diffuse into and out of various portions of the fuel cell structure.

Figure 2:
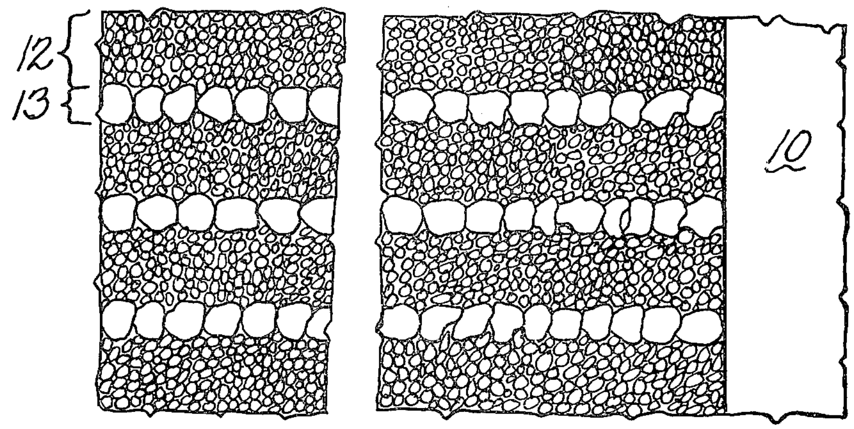
FIGS. 2 and 3 are schematic cross-sectional views of the structure obtained according to two embodiments of this invention.

Referring now to FIG. 2, an electrode structure according to an embodiment of this invention is shown, it being recognized that the figure is foreshortened both in the horizontal and vertical directions. The electrode consists of a porous conducting substrate 10 which may be the carbon paper similar to that described with respect to FIG. 1. Since substrate 10 provides the structural support for the electrode it should be recognized that this drawing is not to scale and substrate 10 is normally much thicker than the catalyst and Teflon layers which it supports. The body of the electrode consists of alternate layers of porous, hydrophobic material 12 and porous, hydrophilic, catalyst-containing material 13.

In the embodiment shown in FIG. 2 the hydrophobic layers 12 are formed of submicron size particles of Teflon and the catalyst-containing layers 13 are formed from platinum supported on carbon black, also having a micron or submicron particle size. In addition, a trace amount of Teflon was added to the catalyst layer to assist in bonding. In this embodiment the layers of hydrophobic material were approximately 20 microns thick and the catalyst-containing layers were 10 microns thick. It is not necessary that the catalyst layers and the hydrophobic layers be the same thickness and, in fact, it is preferable in many instances that the hydrophobic layers be thicker than the hydrophilic catalyst-containing layers to permit a balancing of the amounts and rates of flow of the various reactants through the electrode structure.

Figure 3:
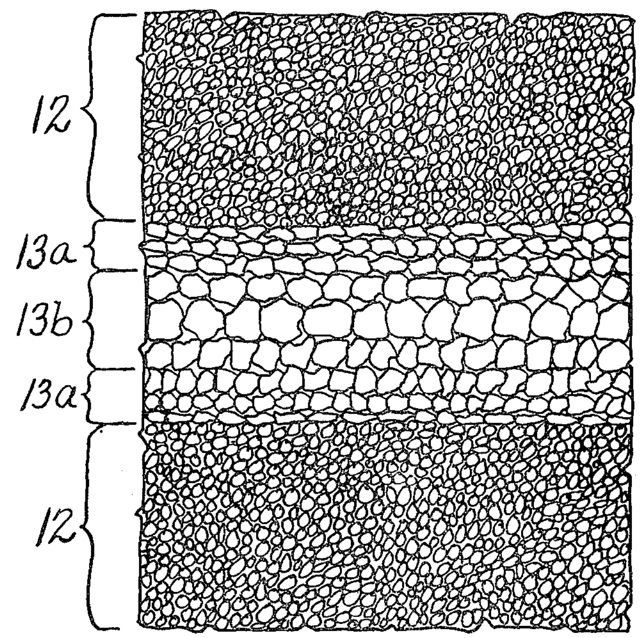

In FIG. 3 a detailed view of another embodiment of the invention is shown in which the detailed structure of layers 12 and 13 is exemplified, it being understood that the detailed portion of FIG. 3 is a portion of an electrode having the general structure shown in FIG. 2. In this embodiment the layer 12 of Teflon material is similar to that of FIG. 2. The catalyst layer 13, however, consists of dissimilar portions 13*a* and 13*b*, 13*a* being platinum on a support such as 20% platinum on carbon black; 13*b* being plain carbon black. In this embodiment the catalyst-containing material is concentrated at the interface between the hydrophilic and hydrophobic regions where the gas and liquid reactants are permitted to come in contact rather than in the center of layer 13 where there will be no gas flow and any catalyst located there will necessarily be wasted. In FIG. 3, the Teflon layer 12 is approximately 10 microns thick, the catalyst-containing layers 13*a* are each approximately 2.5 microns thick and the noncatalyst containing layer 13*b* approximately 5 microns thick, making the total thickness of layer 13, 10 microns.

Figure 4:
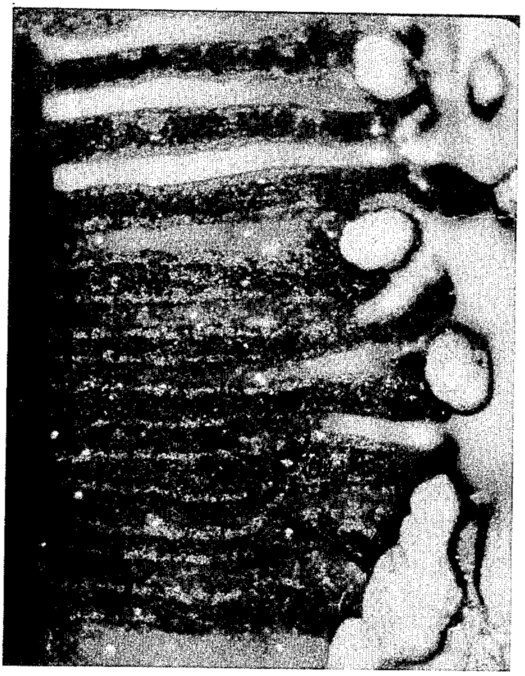
FIG. 4 is a photomicrograph through the structure of FIG. 2.

FIG. 4 is a photomicrograph of the structure produced according to FIG. 2 and the clear demarcation between the hydrophobic regions 12 which show up as the light passages, and the hydrophilic catalyst-containing regions 13 which show as the dark passages, is obvious. An electron backscatter photograph (not shown) indicates that the catalyst is concentrated at the interface between these passages in the structure of FIG. 3.

The electrodes, according to this invention, can be simply fabricated by depositing successive layers of material, one upon the other until a structure having the desired thickness is obtained. Thus, for example, a "Millipore" (trademark of Millipore Corporation, Bedford, Mass. 01730, U.S.A.) filter or a Teflon tape filter having the desired configuration, is used to develop a filter cake having the desired properties. As the thickness of the filter cake builds up, the time taken to filter down each successive layer becomes progressively longer. When this time becomes excessively long the filter medium, bearing the deposited layers, is carefully removed from the filter crock and placed on a cutting board. Using a sharp blade the layered structure is sliced across the middle, one half of said layered structure is turned over and stacked on top of the other half and the exposed layer of filter medium is carefully peeled off. This process of cutting, stacking and peeling is repeated six or seven times until a compact block 18 of the desired thickness is obtained. The block 18, schematically illustrated generally in FIG. 5, consists of alternate horizontal layers 12 and 13. After the block has been formed, it would be cut along line *a—a* into a sheet of desired thickness, such as about 0.004 inch and then the sheet bonded to a supporting substrate such as shown at 10 in FIG. 2. Since gaseous-diffusion electrodes presently used in gaseous-diffusion fuel cells, have dimensions of the order of a foot to a foot and a half in length and 8 or 9 inches in width, it may not be practical to fabricate an electrode block such as shown in FIG. 5 having the final dimensions of the electrode since a substantial number of passes would be required to produce such a block. Instead, the block 18 of FIG. 5 can be substantially smaller than the finished electrode; the finished electrode instead being formed of a multiplicity of thin panels 20, each panel being a sheet cut from the block along planes parallel to line *a—a*, and then arranged on the supporting substrate 10 of FIG. 2, in a window pane pattern as is shown in FIG. 6. As an alternate to the window pane approach, a long strip of electrode could be fabricated of perhaps 10 or 15 alternate layers of catalyst and hydrophobic material and the sheet then rolled in "jellyroll" fashion from which a circular electrode which could then be cut as shown in FIG. 7 along line *b—b*.

While various techniques such as spraying, electrocoating or screen printing for example are known to the art for depositing alternate layers of hydrophobic materials and hydrophilic and catalyst-containing materials, which may be used to practice this invention, the following examples will describe the preferred filtration techniques employed by the applicants. It should be noted that while the following specific examples provide the details used by the applicants in the preparation of certain embodiments of their invention, certain general criteria should be followed in conducting the filtration processes.

I. In order to obtain uniform, thin (in the order of magnitude of microns) layers by filtration, the suspended solids should be in a submicron state of subdivision. This is no particular problem since the basic particles in commercially available metal blacks, carbon blacks, and Teflon dispersions are of this order of magnitude.

II. The dispersions which are to be filtered, should be very dilute to inhibit agglomeration of the particles.

III. The dispersing medium should be capable of wetting the hydrophobic materials, for otherwise it will be impossible to filter through the previously deposited hydrophobic layers. Water containing wetting agents, such as Triton X–100 (trademark of Rohm and Haas Co., Philadelphia, Pa. 19105, U.S.A.) or alcohol-water mixtures which wet the otherwise hydrophobic materials, are preferred because of their commercial availability and relatively low cost.

IV. The filter medium employed should be smooth, flat and highly porous with pores in the magnitude of less than 5 microns. Stretched, sintered Teflon tape or commercial grades of Millipore filters have been found to be quite satisfactory.

Example 1

A filter surface of approximately 680 square centimeters was employed. A catalyst dispersion was prepared from 1.197 grams of 20% platinum on carbon black (Vulcan XC–72) (trademark of Cabot Corporation, 125 High St., Boston, Mass. 02110, U.S.A.) in 500 milliliters of water plus 1500 milliliters of isopropanol to provide a liquid capable of wetting the hydrophobic layer. Sixty milligrams of Teflon 30 were included in the catalyst dispersion to assist in bonding of the layers. Ultrasonic agitation was used to promote dispersion of the catalysts. Aliquots of 800 milliliters were used to obtain a catalyst layer thickness of 10 microns.

The Teflon dispersion was prepared from 3.945 grams of Teflon 30 (60% solids) in 500 milliliters of water plus 1500 milliliters of isopropanol. Gentle stirring only was required to maintain the Teflon, which contains in its commercially available form a small amount of Triton X–100 dispersing agent, in dispersion. Approximately 800 milliliters of the dispersion were required to form a 10 micron layer of the material. A filter cake mat was built up by alternately depositing Teflon and catalyst dispersion and it was determined that approximately 120 microns of thickness could be deposited with a HAWP "Millipore" filter, having 0.45 micron pores, in approximately 4 hours. When using unsintered Teflon tape having a pore size of 0.5 micron about 90 microns of thickness could be deposited in the same time period. The final layer was a half thick Teflon layer. A layer block was made by folding over the filtered layers on themselves. After each fold, the top exposed filter media was stripped off to expose the filter layers for the next fold. A total of six folds were made. It was found that removal of the filter cake from the filter media could be facilitated if the first layer applied to the filter media was a thin layer of binder free carbon black, which acts as a separating agent. The layer cake block was bonded together by using a light pressure (about 10 psi). It was then air dried and vacuum dried at 120°C before the finished block was heated for 5 minutes at 325°C under 100 psi to sinter the Teflon. The block, having a configuration similar to that shown in FIG. 5 was then sliced transversely into sheet approximately 4 mils thick and bonded to a carbon paper substrate 10. The freshly cut surface of the slab so produced can, if desired, be sprayed with carbon black to provide means for absorbing impurities from the electrode before they could absorb on and poison the catalyst surface. An electrode of the type so produced when tested in an experimental cell with 95% $H_3PO_4$ at 160°C gave a voltage of 775 mV at 200 mA/cm$^2$ versus a dynamic hydrogen electrode utilizing oxygen as the oxidizing agent. The electrode contained 0.70 mg of platinum per square centimeter.

Example 2

A fuel cell electrode, according to FIG. 3, was produced in a manner similar to Example 1, except that the Teflon layers were 10 microns thick and the catalyst-containing layer had the catalyst concentrated at the interfaces between the Teflon and the catalyst. The overall catalyst layer thickness was 10 microns consisting of a 5 micron core of graphitized Vulcan sandwiched between two 2.5 micron layers of 20% platinum on graphitized Vulcan. Except for the need of an uncatalyzed graphitized Vulcan dispersion, the dispersions were similar to those provided in Example 1 with only the aliquots being changed. An electrode produced according to Example 2 when tested in an experimental cell with 95% $H_3PO_4$ at 160°C gave a voltage of 746 mV at 200 mA/cm$^2$ versus a dynamic hydrogen electrode utilizing oxygen as the oxidizing agent. The electrode contained 0.32 mg of platinum per square centimeter.

While this invention has been described with respect to several embodiments thereof, it should not be construed as being limited thereto. Various modifications and substitutions will be obvious to a worker skilled in the art and can be made without departing from the scope of this invention which is limited only by the following claims, wherein:

We claim:

1. An electrochemical cell electrode comprising a first face adapted to be exposed to an electroylte and a second face adapted to be exposed to a gaseous fuel cell reactant, a plurality of porous hydrophobic regions extending between said first and second faces and a plurality of porous hydrophilic catalyst-containing regions extending between said first and second surfaces, said hydrophobic and hydrophilic regions being disposed alternately with each other with the interfaces between said regions being contiguous and clearly defined across the thickness of the electrode from said first surface to said second surface.

2. The electrode of claim 1 wherein the catalyst in the catalyst-containing layers is concentrated at the interface between the catalyst-containing layer and the hydrophobic layer.

3. The electrode structure of claim 1 wherein said hydrophobic region is polytetrafluoroethylene and said catalyst-containing region is platinum supported on carbon.

4. A method for preparing a fuel cell electrode which comprises:

a. forming a porous layer of a hydrophobic material, b. depositing upon said layer of hydrophobic material a porous layer of catalyst-containing material, c. repeating steps (a) and (b) until a layered structure having a predetermined thickness is obtained, d. slicing said layered structure transversely to said layers to provide a thin sheet having a thickness substantially smaller than the length and width of said sheet and having a multiplicity of alternate hydrophobic and hydrophilic strips with clearly defined interfaces there between extending across the thickness of said sheet.

5. The process of claim 4 wherein said alternate layers are formed by filtration.

6. The process of claim 4 further comprising the step of depositing a release agent on the filter media prior to the deposition of the first layer of hydrophobic material.

7. The process of claim 4 in which the dispersion to be filtered is in a liquid which wets the hydrophobic material.

8. The process of claim 4 further comprising the step of applying a multiplicity of said sheets to a substrate in abutting side by side relationship whereby an electrode substrate larger than said sheet can be formed.

9. The process of claim 4 including, after step (c) the step of forming a block by stacking a plurality of said layered structures on each other, and wherein the step (d) of slicing said layered structure includes slicing said block traversely to said layers.

10. The process of claim 9 wherein, the step of forming a block includes cutting said structure transversely to said layers into a plurality of sheets and stacking said smaller sheets on each other to form a block.

11. The process of claim 9 wherein said step of forming a block includes the steps of:

cutting said layered structure transversely to said layers into a plurality of laminates of substantially identical size and shape and stacking said laminates on each other forming a first intermediate structure, cutting said first intermediate structure transversely to said layers into a plurality of laminates of substantially identical size and shape and stacking the laminates so formed on each other forming a second intermediate structure, and continuing in like manner cutting each successively formed intermediate structure transversely to said layers into a plurality of laminates and stacking such so formed laminates on each other until a block of predetermined thickness is obtained.

* * * * *